United States Patent [19]

Nowak et al.

[11] 4,428,771

[45] Jan. 31, 1984

[54] PROCESS FOR THE SEPARATION OF METALS FROM A GASEOUS MIXTURE FORMED DURING REDUCTION

[75] Inventors: Rudolf Nowak; Gerhard Holland, both of Frankfurt am Main, Fed. Rep. of Germany

[73] Assignee: Halomet AG, Basel, Fed. Rep. of Germany

[21] Appl. No.: 881,517

[22] Filed: Feb. 27, 1978

Related U.S. Application Data

[63] Continuation of Ser. No. 724,516, Sep. 20, 1976, abandoned.

[51] Int. Cl.$^3$ .............................................. C22B 5/16
[52] U.S. Cl. .................................... 75/89; 75/66; 75/67 R; 75/70; 75/80; 75/88; 420/590

[58] Field of Search ................ 75/66, 67 R, 70, 80, 75/88, 135, 89; 420/590

[56] References Cited

U.S. PATENT DOCUMENTS

| | | | |
|---|---|---|---|
| 1,872,611 | 8/1932 | Thurm | 75/66 |
| 2,365,346 | 12/1944 | Kruk | 266/148 X |
| 2,381,405 | 8/1945 | Griswold, Jr. | 75/67 R |
| 2,685,346 | 8/1954 | Deyrup et al. | 75/135 |
| 3,367,646 | 2/1968 | Robertson et al. | 75/135 |

Primary Examiner—M. J. Andrews
Attorney, Agent, or Firm—Learman & McCulloch

[57] ABSTRACT

Metal is separated from a gaseous mixture formed during reduction of a compound and which contains metal vapour by contacting the compound with an absorbent capable of absorbing the metal vapour and under thermodynamic conditions such that the metal vapour is directly absorbed by the absorbent.

18 Claims, No Drawings

PROCESS FOR THE SEPARATION OF METALS FROM A GASEOUS MIXTURE FORMED DURING REDUCTION

This is a continuation of application Ser. No. 724,516, filed in the U.S. Pat. Office on Sept. 20, 1976, now abandoned.

This invention relates to a process for the separation of a gaseous mixture which contains the vapours of metals and/or semimetals. Gaseous mixtures of these kinds are formed in various processes, for example, in the thermal decomposition of hydrides, nitrides, sulphides and halides, and also in the reduction of oxides with hydrogen, water gas, generator gas, natural gas and other gaseous reducing agents, as well as with liquid or solid reducing agents, such as fuel oil, coal and coke or petroleum coke.

In the interests of simplicity, processes such as these will hereinafter be generically referred to as "reduction", because they are always accompanied by the formation of elemental metal or semimetal vapour, albeit in mechanical admixture with other gaseous substances.

In addition, metals, including the metals of the First and Second Group of the Periodic System, and semimetals and mixtures thereof, will be referred to in the interests of simplicity as "metal" and their corresponding compounds and mixtures of these compounds as "compound".

Again in the interests of simplicity, the gaseous substances mixed with the vapours of elemental metal will be referred to hereinafter as "gases". Gaseous substances of this kind are, for example, CO, $CO_2$, $H_2O$, $SO_2$, $H_2S$, $O_2$, $N_2$, gaseous sulphur, gaseous low-grade halides, oxides and sulphides, and also saturated gaseous metal and semimetal compounds.

Hitherto, vain attempts have been made to separate economically the vapour of elemental metal present for example in the gaseous mixtures resulting from the reduction of oxides with solid, liquid or gaseous carbon-containing and hydrogen-containing substances, in order to recover metals. For example, the quenching of a gaseous mixture of Mg-vapour and CO was only partly successful and by no means economical because a large part of the Mg-vapour is reoxidized by the CO into magnesium oxide. This is because, if a gaseous mixture formed, for example, by reduction consisting of metal vapour and other reduction products, such as CO, $CO_2$ and $H_2O$, is cooled, the temperature-dependant thermodynamic vapour-gas equilibrium is reversed, metal vapour being reoxidized into the metal oxide, in many cases even with the simultaneous formation of carbon black. Accordingly, the quenching of gaseous mixtures such as these always results in the formation of metal powders which are contaminated by an uneconomically large amount of oxide. This also applies in the same way to any other reversible temperature-dependent gas-metal vapour equilibria. Accordingly, these processes have never been successfully worked on an industrial scale both for technical and for economic reasons.

In other known processes, hot gaseous mixtures containing metal vapours, such as are formed in carbo-thermal reduction, are quenched with much cooler metal melts at a temperature below the respective condensation level of the metal vapours to be separated. In said process at first the metal vapours are condensed, then the condensates (e.g. as a mist consisting of small droplets) form liquid alloys with the molten quenching metals while a part of the metals to be gained is again reformed into the original metal oxides. The metal yield is not satisfactory.

Attention is drawn to the fact that the term "absorption" in many publications is not correctly used. In physics and chemistry "absorption" means the taking up of gases by liquids and solids, e.g. the taking up of $CO_2$ by water or of Mg-vapour by molten Sn. In contrast hereto, the taking up of a mist or an aerosol consisting of fine droplets by a liquid (melt) is no "absorption" but a mixing or solving procedure.

In another known process for separating carbon monoxide from a gaseous mixture containing magnesium varpour, the mixture is brought into contact with metal carbides, the carbon monoxide oxidizing the surface of the carbide particles to form metal oxides with deposition of carbon. The carbide particles are then regenerated with the carbon deposited to form the carbides. The formation of oxide-carbide mixtures, as residue of CO left for thermodynamic reasons in the magnesium vapour obtained and considerable superheating and supercooling of the solids, make this proposed process both technically and economically impractical.

The recovery of metals by melt electrolysis was finally left as a possible method of obtaining numerous metals. The disadvantages of these processes which, today, are almost exclusively used for the large-scale recovery of aluminum, magnesium and many other metals, lie above all in the poor volume-time yield, the expensive electrical installations, and the consumption of large quantities of electrical energy.

Accordingly, the object of the present invention is to obviate the disadvantages referred to above by providing a process for the separation of a gaseous mixture (which is formed during the reduction of a compound and which contains the vapour of elemental metal and/or semimetal) by contact with an absorbent (metals and metal salts in solid or liquid form) which can be carried out simply and economically and which in particular enables electrical energy to be saved.

According to the invention, this object is achieved by virtue of the fact that the gaseous mixture is brought into contact with an absorbent which is capable of absorbing the metal vapour, preferably in the form of a melt, under such thermo-dynamic conditions that the absorbent directly absorbs the metal vapour from the gas phase.

It has been found that the vapour of elemental metal and/or semimetal is absorbed in the absorbent (metals and metal salts in solid or liquid form) to a large extent or completely, depending upon the particular procedure adopted in practice, whereas the other gaseous constitutes are not.

In the application of the process according to the invention, therefore, the metal vapour contained in the gaseous mixture must remain gaseous en route to the absorbent and also during absorption. In the application of the process according to the invention, a gaseous mixture will generally arrive at the absorption stage in the thermodynamic state which is assumed during its formation. The thermodynamic conditions have to be taken into consideration in the event of any changes in temperature or pressure by changing the pressure or temperature or the composition of the gaseous mixture in such a way that the gas phase remains intact. Shortly, the absorption of the metal vapour according to the invention always is effected at a temperature (absorption temperature) above the respective condensation level of the metal vapour to be separated. Condensation level means that temperature at which a gas or vapour depending from its partial pressure condenses to a liquid or a solid. The normal condensation level is only a special case, viz. that temperature at which a gas or vapour condenses at a partial pressure of 1 atm. The necessary quantitative temperature and pressure conditions may be thermodynamically calculated with the means known at the present time for any reversible equilibrium and gaseous mixture, and may be experimentally determined.

In contrast to the process according to the invention, the hot metal vapour to be separated in conventional processes condenses in the surroundings and in the vicinity of the surface of the much cooler metal (for example in bubbles or in droplets), with which the gaseous mixture is brought into contact, to form the liquid or solid metal. In these processes, absorption of the metal vapour to be separated from the gas phase directly into the metal is by nature impossible because, due to cooling far below the boiling point or below the melting point of the gaseous metal, it always has to pass first into the liquid or solid phase before it can be absorbed in the metal.

The absorbent used in accordance with the invention should have as high an "absorption capacity" (alloying affinity, chemical affinity) as possible for the metal to be absorbed, coupled with an extremely low vapour pressure at the working temperature, in addition to which, when it is used in the form of a melt, it should have as low a melting point as possible for technical reasons and, when it is additionally used for transporting heat in endothermic reduction reactions, it should have as high as possible a heat capacity and/or evaporation enthalpy and, finally, it should incur the lowest possible production costs for economic reasons. In many cases, these requirements give rise to the need to combine with one another several metals and/or semimetals according to their chemical, physical and thermodynamic properties and also their prices.

The metals, metal and semimetal salts, and semimetals used in accordance with the invention for the absorption of metal vapours, also every possible mixture, solution, alloy and compound thereof, are hereinafter referred to simply as "absorbent". The absorbent may be used in solid form, for example in the form of small beads, Raschig rings or nests of tubes, in liquid form, or in gaseous form.

It is known that chemical and physical reactions are accelerated when the reactants, as far as possible in statu nascendi, are intimately mixed with and whirled through one another in finely distributed form. Accordingly, it is of advantage vigorously to whirl the compound with the absorbent during reduction, i.e., the gaseous mixture during its formation. In this way, absorption of the metal vapours is accelerated and the need for a separate absorption chamber is eliminated.

During the separation of a metal vapour from an already formed gaseous mixture, which takes place in countercurrent with an absorbent, the amount of metal vapour in the gaseous mixture decreases. As a result, the tendency which the compound has to reform is reduced, so that the temperature can decrease accordingly during absorption or along the absorption path without the compound being reformed. Accordingly, it is not absolutely essential for the entire separation of the gaseous mixture to be carried out at the reduction temperature. However, any reformation of the compound in the gaseous mixture is reliably avoided if the temperature of the absorbent, on beight brought into contact with the gaseous mixture, is at least as high as the temperature of the gaseous mixture during its formation.

In endothermic reduction reactions, the reactants and, optionally, the absorbent as well are known to cool down when no heat is conveyed to the system. Heat may be applied in known manner, for example by means of electrical energy or by heating with fuels. However, in order to simplify the apparatus and to avoid problems of materials, it is preferred in accordance with the invention to adopt a procedure in which, during its formation, which is accompanied by reduction, the gaseous mixture is brought into contact with the absorbent with a heat content which is used at least partly for maintaining the reduction temperature.

According to the invention, it is even possible to manage with a smaller quantity of absorbent providing its heat of evaporation is utilized. Accordingly, another feature of the invention is that, during its formation accompanied by reduction, the gaseous mixture is brought into contact with at least part of the absorbent in gaseous form which is condensed.

In order to heat the absorbent before it is used for separation, heat may be conveyed to it in known manner indirectly, i.e., through a container wall, with smoke gases and flame gases of burners, by radiation from electrical resistance heating elements, by induction heating or by direct electrical resistance heating or in any other manner.

So far as the transfer of heat and the outlay on apparatus are concerned, it is of particular advantage in accordance with the invention to heat the absorbent before separation by direct contact with smoke and flame gases and, during combustion, to adjust the fuel/air or oxygen ratio in such a way that the absorbent cannot be oxidised, or to add the necessary amount of reducing gas to the smoke and flame gases.

In cases where it is desired to recover the absorbed metal from the gaseous mixture, it is removed from the absorbent in known manner preferably by desorption by reducing pressure and/or increasing temperature or by rectification, and the resulting metal vapour is cooled so that either liquid or solid metal is obtained.

However, the solution of absorbed metal and absorbent may also be used otherwise as an alloy or as a chemical reagent (for example for deoxidising crude metal melts, as a blowing agent for producing foamed concrete, etc.).

Following separation, it is possible in accordance with the invention either to desorb the entire solution of absorbed metal and absorbent or further to use only parts thereof (for example as an alloy and/or chemical reagent) and to desorb the rest and then to reuse the absorbent for the separation thereof or of another gaseous mixture.

Most of the waste gases from reduction reactions contain large quantities of CO and $H_2$. According to the invention, therefore, the economy of the process is improved if, following separation, the non-absorbed waste gas or at least a part of this waste gas is used as a fuel and/or another part as chemical reagent (for example as a reducing agent for the synthesis of $NH_3$ or plastics).

If an absorbent can be chemically attacked by the gases formed during reduction, this effect is avoided in accordance with the invention by the addition of an adequate quantity of a gas preventing this chemical attack to the gaseous mixture during its formation either during or after reduction.

In the still process, the gases leaving the absorbent take with them a small amount of the absorbed metal in vapour form. According to the invention, this may be avoided by bringing the gaseous mixture into contact with the absorbent in countercurrent during its formation during and/or after reduction. The fresh absorbent absorbs the last traces of the metal vapour in countercurrent, becomes enriched with metal from the gaseous mixture along the absorption path, and leaves the apparatus saturated with the absorbed metal.

According to the invention, it is of particular advantage to combine the countercurrent process with the recycle process. The gaseous mixture is continuously brought into contact with the absorbent in countercurrent during its formation during and/or after reduction. The absorbent is continuously desorbed, is directly or indirectly heated in countercurrent, optionally continuously, and is continuously reused for absorption.

In cases where solids such as coke or coal are used for reduction and/or for directly heating the absorbent, the absorbent takes up small quantities of metals, emanating from the mineral constituents of the solid reducing agents and/or fuels, such as iron, aluminum, silicon, alkali and alkaline earth metals, from the fly dust entrained by the gaseous mixture or on contact with the reduction reactants and/or smoke gases. In order to avoid harmful accumulations or enrichments, especially in cases where the absorbent is recycled, the absorbent is in accordance with the invention periodically or continuously freed from impurities in known manner until only harmless residues are left. For example, alkali and alkaline earth metals are removed by desorption, aluminium and silicon are vaporized by the action of halogens or halides, and iron is oxidised with air and the solid iron oxides separated from the absorbent.

The invention is illustrated by the following Examples.

EXAMPLE 1

In the reduction of $Na_2O$ with C at 1000° C., a gaseous mixture with the following composition is formed:
64.212% by volume of Na-vapour
35.788% by volume of CO
The reaction pressure is 3.5 atms. After reduction, this mixture is brought into contact in countercurrent with molten lead heated to 1030° C. as absorbent. It absorbs the Na-vapour whilst pure CO escapes. A melt with the following composition:
83% by weight of Pb and
17% by weight of Na,
is obtained and is desorbed in a rectification column at 1050° 1 C./0.1 atm (76 Torr). The Na-vapour escaping from the rectification column is condensed and the lead melt containing a small residue of sodium is reused as absorbent for separating the Na-vapour from the CO.

EXAMPLE 2

50 t/h of calcined magnesite are continously reduced at 1650° C. with 33,000 $Nm^3/h$ of natural gas (85% by volume of $CH_4$ and 15% by volume of $N_2$) in a tower consisting of several chambers.

Whilst the mixture of magnesite dust and the cracking products of the natural gas flows upwards, a gaseous mixture of 27,630 $Nm^3/h$ of magnesium vapour, 27,640 $Nm^3/h$ of carbon monoxide, 55,350 $Nm^3/h$ of hydrogen and 4950 $Nm^3/h$ of nitrogen is formed. 330 $m^3/h$ of absorbent consisting of 42.8% by weight of lead and 57.2% by weight of tin, which has been heated to a temperature of 1840° C., are passed continuously through the chambers in counter-current (downwards). A further quantity of absorbent, in the form of 106,700 $Nm^3/h$ of hot lead vapour distributed among the individual chambers is introduced at a temperature of 1840° C.

The reaction pressure during the reduction of MgO with natural gas at a temperature of 1650° C. is approximately 0.5 atm. A working pressure of approximately 1 atm is reached by the introduction of lead vapour.

The lead vapour and the Pb/Sn melt cool down to the reduction temperature, the lead vapour being condensed into liquid lead. The heat of evaporation of the lead vapour and the sensible heat of lead vapour and Pb/Sn melt supply the heat required for reduction, the entire Pb/Sn melt directly absorbing the magnesium vapour from the gaseous mixtures as it is formed; CO, $H_2$ and $N_2$ leave the tower at its uppermost part.

450 $m^3/h$ of a melt consisting of 4.4% by volume of Mg, 48.5% by volume of Sn and 47.1% by volume of Pb, flow off continuously from the lower end of the tower. Whereas the vapour pressure in the chambers of the tower during reduction and absorption amounts to approximately 1 atm, the melt is desorbed in a rectification column under a pressure of only 10 Torr, 30 t/h of Mg-vapour escaping continuously from the melt. The Mg-vapour is cooled to 720° C., liquefying in the process.

During desorption, the melt is left with a residue of approximately 0.01% by weight of Mg which is continuously entrained in the recycle process. The melt is again continuously heated to 1840° C., 106,700 $Nm^3/h$ of lead evaporating again. As already described, lead vapour and residual melt are again introduced into the tower. For heating the melt and evaporating the lead the 87,940 $Nm^3/h$ of $(CO+H_2+N_2)$ continously escaping during separation of the gaseous mixture and in addition 19,000 $Nm^3/h$ of natural gas are burnt with air in gas burners. Before combustion, the air is heated by smoke gas of the gas burner, which has a temperature of 1900° C., in a radiation recuperator.

Impurities emanating from the calcined magnesite, such as iron, aluminium, silicon, calcium, sodium and potassium, accumulate in the recycled (heating-absorption-desorption-heating) Pb-Sn melt. The melt is periodically cooled as required to 1000° C. and treated with air, resulting in the formation of mixed oxides of $Fe_3O_4$, $Al_2O_3$, $SiO_2$, CaO, MgO, $K_2O$ and $Na_2O$. They flow as crusts on the liquid Pb-Sn melt and are separated off.

A gaseous mixture formed during the reduction of pure MgO with natural gas can of course also be separated in accordance with the invention, which affords the additional advantage that no impurities accumulate in the absorbent so that the need for purifying the absorbent according to Example 2 is eliminated.

Pure MgO is obtained for example in the reduction of pure aluminium chloride, followed by burning of the $MgCl_2$ formed or in the reduction of pure $Al_2O_3$ with Mg to form pure aluminium. Processes such as these are now of outstanding significance because, in a recycle process comprising for example (1) reduction of $Al_2O_3$ with Mg (to form Al and MgO)

(2) the reduction of MgO with natural gas (to form Mg-vapour and CO)
(3) the separation of Mg and CO in accordance with the invention
(4) the reduction of $Al_2O_3$ with Mg the process according to the invention enables substantially non-reducible metals, such as Mn, Cr, Al, Ti and Zr to be recovered surprisingly economically.

If in accordance with Example 2 the heat required for endothermic reduction of the MgO were to be conventionally supplied and if pure lead were to be used for separating the gaseous mixture (Mg-vapour+$H_2$+CO+$N_2$), 1200 $m^3$/h of Pb melt would be required for absorbing the 30 t/h of Mg-vapour. If pure tin were to be used, only 300 $m^3$/h of Sn melt would need to be introduced because under the Mg partial pressure prevailing tin is able to absorb considerably more magnesium than lead. If the heat required was to be supplied by means of a melt of absorbent, as much as 8580 $m^3$/h of lead (1730° C.) or 3150 $m^3$/h of tin (1840° C.) would be necessary (the boiling point of lead is 1753° C.).

However, if as in Example 2 condensing lead vapour is used as heat source for the reduction of MgO and, in addition, if molten tin is used as the principal absorbent, a Pb-Sn-melt formed as absorbent. From the technological point of view, the problem of heat supply for the endothermic reduction of MgO is elegantly solved in this way. If then following separation the magnesium is removed from the melt and the melt reheated to 1840° C., lead vapour is again formed, although on this occasion, depending upon the temperature, pressure and activity conditions prevailing, a proportion of lead remains behind in the melt and is continuously circulated together with the tin in the recycle process. Out of this there arises the optimum input of 330 $m^3$/h of Pb-Sn melt containing 42.8% by weight of Pb and 57.2% by weight of Sn as liquid absorbent, and 106,700 $Nm^3$/h of condensed lead vapour as the additiional amount of absorbent and heat carrier, coupled with elimination of the need for separate heating of the reduction apparatus.

EXAMPLE 3

In the reduction of zinc oxide with carbon at 1000° C., a gaseous mixture of
50.37% by volume of Zn vapour,
48.89% by volume of CO and
0.74% by volume of $CO_2$
is formed. This mixture is brought into contact with steel elements (as absorbent) in an absorption chamber. The steel absorbs the zinc vapour, whilst the zinc-free waste gas consisting of CO and $CO_2$ leaves the absorption chamber. The zinc is absorbed in the surface of the steel elements up to a content of 70% by weight which in a 1 mm thick surface layer decreases inwards to 0% of Zn.

EXAMPLE 4

In the reduction of MnO with low-sulphur petroleum coke at 1750° C., a gas mixture consisting of 50% by volume of manganese vapour and 50% by volume of CO is formed. Since the reaction pressure is only 0.3 atm, this pressure or a lower pressure as the working pressure would have to be produced by evacuation. Technically it is simpler to add nitrogen in order to reach a working pressure of 1 atm. In this case the gas mixture consists of
15% by volume of CO,
15% by volume of Mn vapour and
70% by volume of $N_2$ The nitrogen is obtained from part of the smoke gas of a burner freed from $CO_2$, $SO_2$ and steam by washing with water under pressure. It is then heated to 1650° C. in a countercurrent heat exchanger by means of the hot smoke gas and added to the CO/manganese vapour mixture during its formation from the MnO/petroleum coke mixture.

The gaseous mixture is passed through a melt consisting of 82% by weight of Sb and 18% by weight of Al. Whereas the antimony has a particularly high solvent action on manganese, the addition of aluminium prevents the boiling off of antimony whose normal boiling point is 1635° C.

The gaseous mixture is separated in the Sb-Al melt, giving on the one hand a gas of CO and $N_2$, which contains traces of $SO_2$, and on the other hand an Sb-Al melt containing 40% by weight of manganese. The manganese is removed from the Sb-Al melt in a rectification column.

EXAMPLE 5

By heating $Bi_2S_3$ to 900° C. while argon is passed through, a gas mixture is formed by thermal decomposition, containing in addition to argon
57.1% by volume of Bi vapour and
42.9% by volume of $S_2$ vapour
It is introduced into molten tellurium heated to 930° C., resulting in formation of the commercially significant intermetallic compound $Bi_2Te_3$ (melting point 585° C.). The sulphur vapour separated from the Bi vapour escapes.

A reaction pressure which is above or below or equal to 1 atm is adjusted both in dependence upon the thermodynamic properties of the reduction reactants and in dependence upon the reduction temperature. Since the separation of gaseous mixtures in accordance with the invention can be carried out technically more simply when the working pressure is not significantly below 1 atm, it is of advantage in accordance with the invention to add to the gaseous mixture during its formation during and/or after reduction such a quantity of a gas which does not have too adverse an effect upon the metal vapour/gas equilibrium that the required working pressure is reached.

In Example 2, it was pointed out that the reaction pressure of the gaseous mixture of Mg vapour+CO+$H_2$+$N_2$ amounts to approximately 0.5 atm and that this pressure is increased by the introduction of lead vapour to a working pressure of approximately 1 atm. If no lead vapour were to be introduced and if separation of the gaseous mixture were to be carried out at a working pressure of 1 atm for example, 1 $Nm^3$ of for example hydrogen, argon or zinc vapour would have to be introduced per $Nm^3$ of gaseous mixture.

As expected, it has been found that, then absorbent and gaseous mixture are brought into contact after reduction, i.e., in the absence of the reduction reactants, metal vapour is absorbed in a quantity which corresponds thermodynamically to its partial pressure, to the vapour pressure of this metal in its pure form and to its activity in the absorbent at the absorption temperature.

However, if the absorbent is brought into contact with the gaseous mixture as it is formed during reduction, i.e., in the presence of the reduction reactants, and then removed as quickly as possible, it contains a much larger quantity of absorbed metal vapour than corresponds to the thermodynamic laws. Accordingly, an important feature of the invention is that the gaseous mixture is brought into contact with the absorbent as briefly as possible during its formation during reduction.

In cases where an absorbent has a considerable vapour pressure at the working temperature prevailing so that a significant amount of its vapour is entrained by the non-absorbed waste gases, the waste gas pipe is initially encrusted and finally blocked through cooling of the waste gases and condensation of absorbent vapour. This also applies correspondingly to the direct heating of the absorption metal with smoke or flame gases. According to the invention, this danger is obviated by passing the waste gas and smoke gas after they have left the absorbent through a condenser from which the condensate either flows back to the absorption metal or from which it is removed mechanically, physically or chemically (for example by scrapers, melting off or vaporization with chlorine).

In order as far as possible to recover for the process the heat removed from the waste gas in the condenser and the heat content of the smoke gas from the burners which heat the absorbent and also the heat given off during condensation of the metal evaporating off during desorption (collectively "waste heat"), the air and/or the fuel for the burner and/or the reducing agent and/or the compound to be reduced are in accordance with the invention heated in known manner (for example in countercurrent heat exchangers) by the waste heat before they are used for combustion or for reduction. In this way, the need for additional fuel is kept to a minimum which ensures maximum economy of the process according to the invention.

The costs of the process according to the invention are surprisingly low and the consumption of electrical energy minimal, amounting solely to the handling costs of the process where the absorbent and endothermically reacting reduction mixtures are not completely or partly heated by electrical energy. Accordingly, an important economic feature of the invention is that the metal separated off is either directly used as a vapour after desorption or rectification or cooled and liquified into a melt or in solid form for processes which are still extremely expensive or which hitherto it has not been possible to work on a commercial scale for reasons of poor economy. An acute example is the reduction of substantially difficulty reducible metal oxides or halides with metals of the First and Second Group of the Periodic System.

We claim:

1. A process for separating a metal vapor from a gaseous mixture formed during the reduction of a metal compound comprising the steps of (1) contacting the said gaseous mixture with a solid or liquid absorbent metal or metal salt which is capable of absorbing said metal vapor to be separated but not the accompanying gases, the contacting of said absorbent with said gaseous mixture being accompanied under vigorous turbulence by admixing the absorbent into the reduction reaction mixture in which the gaseous mixture is formed; (2) establishing and maintaining thermodynamic conditions of said absorbent metal or metal salt and said gaseous mixture whereby said metal vapor is absorbed directly by said absorbent metal or metal salt from the gaseous state as a solution of said metal and said absorbent and the non-absorbed gaseous components remain as residual gas, said thermodynamic conditions being selected and maintained so that the metal vapor is not reformed into the original compound; (3) separating the solution consisting of the said metal to be separated off and the absorbent from said remaining residual gas.

2. A process according to claim 1 wherein said absorbent is either in liquid or solid form.

3. A process according to claim 1 wherein the temperature of the absorbent on contact with the gaseous mixture is at least as high as that of the gaseous mixture during its formation.

4. A process according to claim 1 wherein the absorbent in gaseous form is condensed.

5. A process according to claim 1 including removing the absorbed metal from the absorbent by desorption and cooling the resulting metal vapour.

6. A process according to claim 5 wherein after the desorption of the absorbent impurities are removed from the absorbent.

7. A process for recovering metals using the separation process according to claim 5, in which an oxide compound of the metal to be recovered is initially reduced with a metallic reducing agent, after which the metal to be recovered is separated from the reducing metal oxide, the reducing metal oxide is reduced to form a gaseous mixture and the gaseous mixture is brought into contact with an absorbent, and the metallic reducing agent recovered by adsorption and desorption is subsequently reused for the first stage of the recycle process.

8. A process according to claim 1 including the step of using the solution of absorbed metal and absorbent as an alloy or chemical reagent.

9. A process according to claim 8 wherein only a part of the said solution are used as alloys or chemical reagents and the rest of the said solution is desorbed and the resulting amount of the absorbent from the said rest is subsequently reused for the separation of the metal vapor from the same gaseous mixture or for the separation of a metal vapor from another gaseous mixture.

10. A process according to claim 1 in that the gaseous mixture is brought into contact with the absorbent in countercurrent.

11. A process according to claim 1 wherein the gaseous mixture is continuously brought into contact with the absorbent during its formation, the absorbent is continuously desorbed, heated in countercurrent, and is continuously reused for absorption.

12. A process according to claim 1 including the step of adding a gas which does not have a substantially adverse effect upon the metal vapour/gas equilibrium to the gaseous mixture during its formation in such a quantity that a predetermined working pressure is reached.

13. A process according to claim 1 including the step of passing the waste gas and smoke gas through a condenser after leaving the absorbent from which the condensate flows back to the absorbent or from which it is mechanically, physically or chemically removed.

14. A process according to claim 1 wherein the absorbent is liquid and has a heat content which is used at least partly for maintaining the reduction temperature.

15. A process according to claim 1 including the step of heating the absorbent by direct contact with combustion gases before separating said metal vapor from the gaseous mixture and, during combination, the fuel/oxidant ratio is adjusted so that the absorbent cannot be oxidized.

16. A process according to claim 15 wherein waste heat from the non-absorbed residual gas and/or from the combustion gas after leaving the absorbent is used for preheating the air for combustion.

17. A process according to claim 1 including the step wherein following separation of the metal vapor at least part of the non-absorbed residual gas is used as fuel for heating the absorbent, and another part thereof is used as a chemical reagent.

18. A process according to claim 1 including the step of, to avoid a possible chemical attack on the absorbent by the gaseous mixture during reduction, adding a sufficient quantity of a gas capable of preventing such attack to the gaseous mixture during its formation in the course of or after reduction.

* * * * *

UNITED STATES PATENT AND TRADEMARK OFFICE
CERTIFICATE OF CORRECTION

PATENT NO. : 4,428,771
DATED : January 31, 1984
INVENTOR(S) : Rudolf Nowak

It is certified that error appears in the above-identified patent and that said Letters Patent are hereby corrected as shown below:

Column 2, line 21, change "as" to -- a --;

Column 4, line 4, change "beight" to -- being --.

Column 5, line 56, change "1050°1C./0.1" to -- 1050° C./0.1 --.

Column 8, line 57, "then" should be -- when --.

Column 10, line 66, change "combination" to -- combustion --.

Signed and Sealed this

Thirteenth Day of November 1984

[SEAL]

Attest:

GERALD J. MOSSINGHOFF

Attesting Officer

Commissioner of Patents and Trademarks